H. F. ELSHOFF.
INDUCTION MOTOR CONSTRUCTION.
APPLICATION FILED FEB. 7, 1906.
911,481.
Patented Feb. 2, 1909.
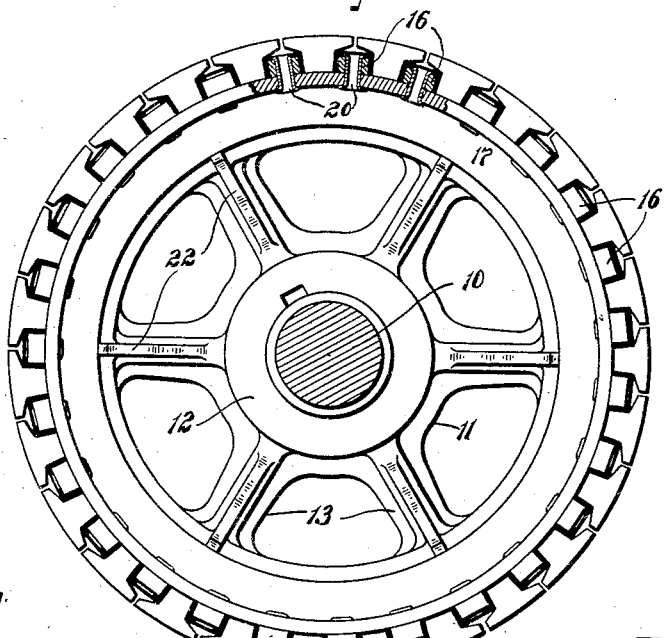
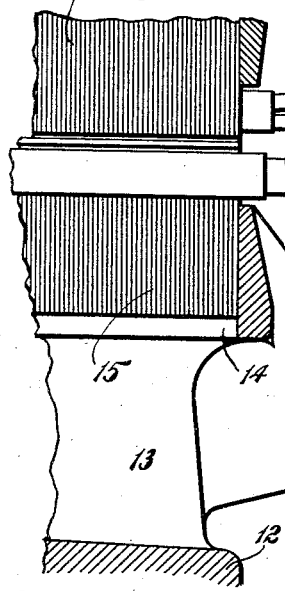
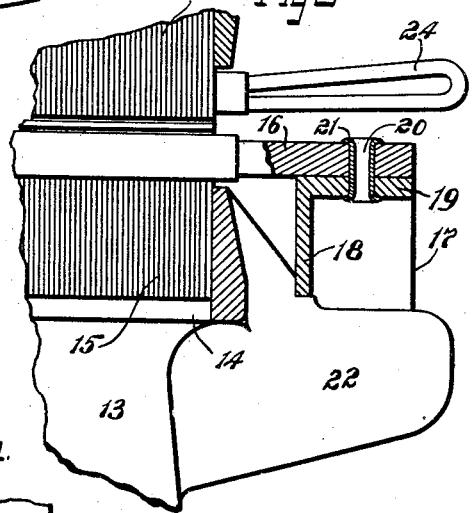
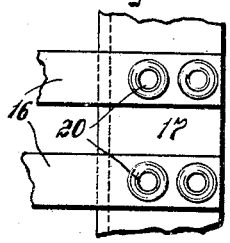
WITNESSES:
George J. Schwartz
Fred J. Kinsey
INVENTOR:
Henry F. Elshoff.
BY
Chas. E. Lord
ATTORNEY.

UNITED STATES PATENT OFFICE.

HENRY F. ELSHOFF, OF NORWOOD, OHIO, ASSIGNOR TO THE BULLOCK ELECTRIC MANUFACTURING COMPANY, A CORPORATION OF OHIO.

INDUCTION-MOTOR CONSTRUCTION.

No. 911,481.

Specification of Letters Patent.

Patented Feb. 2, 1909.

Application filed February 7, 1906. Serial No. 299,864.

*To all whom it may concern:*

Be it known that I, HENRY F. ELSHOFF, citizen of the United States, residing at Norwood, in the county of Hamilton and State of Ohio, have invented certain new and useful Improvements in Induction-Motor Construction, of which the following is a full, clear, and exact specification.

My invention relates to induction motors and more particularly to the means for connecting the conductor bars to the short-circuiting rings in rotors having squirrel cage windings.

One of the objects of my invention is to provide a connection for the conductor bars and the rings which will be inexpensive, simple and effective, and which will permit the parts of the rotor to be assembled more easily and quickly.

A further object is to provide a connection between the bars and the short-circuiting rings whereby the heating of the conductors of the rotor is lessened and which will permit a more effective cooling of the stator coils.

In carrying out my invention I connect the bars to the short-circuiting rings by means of tubular members such as hollow rivets or bolts. By means of this connection not only can the bars be securely attached to the short-circuiting rings without the expenditure of as much time and labor as was formerly required, but the hollow rivets or bolts permit a circulation of cooling air current through the ends of the bars and the short-circuiting rings, whereby the ends of the conductors and the rings are maintained at a more uniform low temperature, and the end-turns of the stator coils which extend beyond the stator core adjacent the ends of the conductor bars and the short-circuiting rings are cooled by the air currents.

My invention furthermore consists in the details of construction and combinations of elements described in the specification and set forth in the appended claims.

For a better understanding of my invention, reference is had to the accompanying drawings, in which—

Figure 1 is an end view of the rotor, parts being broken away and in section for the sake of clearness; Fig. 2 is a section through a portion of an induction motor showing one end of a bar connected to a short-circuiting ring by means of a single rivet; Fig. 3 is a section through a portion of an induction motor showing the use of two rivets for connecting one end of a bar to a short-circuiting ring; and Fig. 4 is a plan view of a portion of a short-circuiting ring and a pair of conductor bars joined together, in accordance with my invention.

Referring now to the figures of the drawing, I have shown at 10 the shaft of the machine on which is mounted the spider 11, which consists essentially of a hub 12, radial arms 13 and rim 14 on which is mounted a laminated core 15. The core is provided with the usual slots in which are mounted conductor bars 16, which extend beyond each side of the core as in the usual manner. The ends of the conductor bars at each side of the machine are connected together by a short-circuiting ring 17. The rings in this case are of the shape of angle sections, each having one vertical portion 18 at right angles to the axis of the machine and a circular ring portion 19 at right angles to the vertical portion. Each conductor bar is connected to the short-circuiting ring by means of one or more tubular members of conducting material such as hollow bolts or rivets 20. I prefer to employ hollow rivets having their ends beaded or spun as show at 21. In small machines, a single rivet or bolt at each end of each bar will be sufficient. This construction is shown in Fig. 2. In larger machines, it may be necessary to provide two, or even more bolts or rivets for each end of each bar to provide a sufficiently strong joint. In Fig. 3 is shown a portion of a motor in which the ends of the bars are each connected to a ring by two rivets or bolts. As is clear from the drawing the spokes of the spider are provided with fan-blades 22 which support the short-circuiting rings, the vertical portions 18 of the rings engaging notched portions of the blades. I prefer to arrange the hollow rivets radially with respect to the axis of the rotor but my invention is not limited to such arrangement.

Surrounding the rotor is the stator, a portion of the laminated core of which is shown at 23. The stator is provided with the usual alternating current winding or windings having end-turns 24 which extend beyond the core and which surround the ends of the conductor bars and the short-circuiting rings.

It is seen that the connection is strong and durable and the parts can be quickly assembled. The air currents created by the fan-blades are driven through the hollow rivets or bolts, not only cooling the bars and the rings but also cooling the end-turns of the stator coils. This is a distinct advantage for the reason that, with the use of solid rivets or bolts, the ends of the bars and the rings frequently become very hot on account of the high resistance of defective joints, and as the temperature rises the rivets or bolts expand in the direction of their length causing the resistance and the temperature of such joints to rise still further. Also with the previous constructions, the cooling of the stator coils by the rotor fans was seriously interfered with by the short-circuiting rings.

I aim in my claims to cover all modifications which do not involve a departure from the spirit and scope of my invention.

What I claim as new and desire to secure by Letters Patent is:

1. In an induction motor, the squirrel cage rotor having a plurality of conductor bars, a conductor ring at each end of the rotor for short-circuiting the bars, and means comprising radial tubular members for connecting the bars and the rings.

2. In an induction motor, a plurality of rotor conductor bars, a conducting ring at each end of the rotor for short-circuiting the bars, and means comprising radial hollow rivets for connecting the bars and the rings.

3. In an induction motor, a stator, a rotor having a plurality of conductor bars, a short-circuiting ring for the bars at each end of the rotor, tubular members for connecting the bars and the short-circuiting rings, and fan-blades on the rotor between the shaft and the rings.

4. In an induction motor, a stator, a rotor having a plurality of conductor bars, a short-circuiting ring for the bars at each end of the rotor, hollow rivets for connecting the bars and short-circuiting rings, and fan-blades on the rotor between the shaft and the rings.

5. In an induction motor, a stator, a rotor having a plurality of conductor bars, a ring at each end of the rotor for short-circuiting the bars, and one or more radial hollow rivets for connecting each end of a bar to a ring.

6. In an induction motor, a plurality of rotor conductor bars, a ring for short-circuiting said bars, and means for connecting the bars and rings, each of said connecting means having a substantially radial opening therethrough permitting a circulation of air.

7. In an induction motor, a stator having windings the end-turns of which extend beyond the stator core, a rotor having a plurality of conductor bars with ends extending beyond the rotor core adjacent the end-turns of the stator coils, short-circuiting rings for the conductors at each side of the rotor core, hollow rivets for securing the ends of the conductor bars to the short-circuiting rings, and fan-blades on the rotor within the conductor bars.

8. A rotor comprising a core, a winding on said core, consisting of bars of conducting material and short-circuiting rings at the ends of the bars, and tubular members for electrically connecting said bars to the rings, said tubular members being arranged radially with respect to the rings, whereby radial circulation of air is permitted through said tubular members.

9. A rotor comprising a core, a winding on said core consisting of bars of conducting material, short-circuiting rings at the ends of said bars, tubular members of conducting material for electrically connecting said bars to said rings, and means for forcing air through said tubular members when the rotor is in operation.

10. In an induction motor, a stator comprising a core and windings thereon, a squirrel cage rotor comprising a core and a winding consisting of a plurality of conductor bars with ends extending beyond the rotor core, short-circuiting rings for the conductor bars, and radial tubular members for electrically connecting said bars to the rings, said tubular rings being adjacent the end turns of the stator winding, and fan blades carried by the rotor whereby air can be forced through the tubular members cooling the connections and the stator coils.

In testimony whereof I affix my signature, in the presence of two witnesses.

HENRY F. ELSHOFF.

Witnesses:
ARTHUR F. KWIS,
FRED J. KINSEY.